United States Patent
Wang

(10) Patent No.: US 7,539,661 B2
(45) Date of Patent: May 26, 2009

(54) TABLE LOOK-UP METHOD WITH ADAPTIVE HASHING

(75) Inventor: Ting Z. Wang, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 467 days.

(21) Appl. No.: 11/143,054

(22) Filed: Jun. 2, 2005

(65) Prior Publication Data

US 2006/0277178 A1 Dec. 7, 2006

(51) Int. Cl.
G06F 7/00 (2006.01)
G06F 17/30 (2006.01)
(52) U.S. Cl. .................. 707/2; 707/7; 711/216
(58) Field of Classification Search ........ 707/4, 707/5, 6, 7, 8, 101, 102, 103, 104
See application file for complete search history.

(56) References Cited

U.S. PATENT DOCUMENTS

| | | | | |
|---|---|---|---|---|
| 4,961,139 A * | 10/1990 | Hong et al. | | 707/1 |
| 5,065,065 A * | 11/1991 | Hikita et al. | | 310/313 B |
| 5,155,484 A * | 10/1992 | Chambers, IV | | 341/55 |
| 5,347,652 A * | 9/1994 | Epstein et al. | | 707/1 |
| 5,490,258 A * | 2/1996 | Fenner | | 711/1 |
| 5,542,087 A * | 7/1996 | Neimat et al. | | 707/10 |
| 5,634,009 A * | 5/1997 | Iddon et al. | | 709/223 |
| 5,694,593 A * | 12/1997 | Baclawski | | 707/5 |
| 5,809,494 A * | 9/1998 | Nguyen | | 707/1 |
| 5,860,136 A * | 1/1999 | Fenner | | 711/201 |
| 5,946,679 A * | 8/1999 | Ahuja et al. | | 707/3 |
| 5,970,495 A * | 10/1999 | Baru et al. | | 707/102 |
| 6,031,935 A * | 2/2000 | Kimmel | | 382/173 |
| 6,236,988 B1 * | 5/2001 | Aldred | | 707/3 |
| 6,289,358 B1 * | 9/2001 | Mattis et al. | | 707/203 |
| 6,292,795 B1 * | 9/2001 | Peters et al. | | 707/3 |
| 6,321,240 B1 * | 11/2001 | Chilimbi et al. | | 707/206 |
| 6,442,553 B1 * | 8/2002 | Take | | 707/100 |
| 6,496,820 B1 * | 12/2002 | Tada et al. | | 707/5 |
| 6,535,867 B1 * | 3/2003 | Waters | | 707/1 |
| 6,665,661 B1 * | 12/2003 | Crow et al. | | 707/3 |
| 6,725,223 B2 * | 4/2004 | Abdo et al. | | 707/100 |
| 7,124,266 B1 * | 10/2006 | Harmer et al. | | 711/163 |
| 2002/0099691 A1 * | 7/2002 | Lore et al. | | 707/2 |
| 2002/0138648 A1 * | 9/2002 | Liu | | 709/245 |
| 2003/0126122 A1 * | 7/2003 | Bosley et al. | | 707/3 |

(Continued)

OTHER PUBLICATIONS

F. Klemm, A. Datta, K. Aberer: A Query-Adaptive Partial Distributed Hash Table for Peer-to-Peer Systems. International Workshop on Peer-to-Peer Computing & Databases (P2&DB 2004). Crete, Greece, Mar. 2004.

*Primary Examiner*—John R. Cottingham
*Assistant Examiner*—Mohammed R Uddin
(74) *Attorney, Agent, or Firm*—Jimmy L. Funke

(57) ABSTRACT

Accessed memory locations of a data table are assigned weights based on usage history, and a hash table chains the highest-weight key values to an abbreviated hash index. The hash table includes keys having at least a predetermined weight so that highly accessed keys are identified by hashing. Additionally, the keys chained to a given hash index are ordered based on their weight in order to optimize the overall data retrieval time. The weights assigned to accessed keys are updated over time so that the content of the hash table is adaptively updated to suit the current table look-up requirements.

5 Claims, 3 Drawing Sheets

U.S. PATENT DOCUMENTS

| | | | |
|---|---|---|---|
| 2003/0167356 A1* | 9/2003 | Smith et al. | 709/328 |
| 2006/0041560 A1* | 2/2006 | Forman et al. | 707/10 |
| 2006/0101060 A1* | 5/2006 | Li et al. | 707/102 |
| 2006/0106792 A1* | 5/2006 | Patterson | 707/5 |
| 2006/0206505 A1* | 9/2006 | Hyder et al. | 707/100 |
| 2006/0253491 A1* | 11/2006 | Gokturk et al. | 707/104.1 |
| 2007/0043704 A1* | 2/2007 | Raub et al. | 707/3 |
| 2007/0043714 A1* | 2/2007 | Stanton et al. | 707/4 |
| 2007/0043750 A1* | 2/2007 | Dingle | 707/101 |
| 2007/0100793 A1* | 5/2007 | Brown et al. | 707/2 |
| 2007/0168336 A1* | 7/2007 | Ransil et al. | 707/3 |
| 2007/0244850 A1* | 10/2007 | Hoppe et al. | 707/2 |

* cited by examiner

TABLE LOOK-UP METHOD WITH ADAPTIVE HASHING

TECHNICAL FIELD

The present invention relates to accessing stored data by table look-up, and more particularly to an adaptively ordered hashing technique for a limited memory environment.

BACKGROUND OF THE INVENTION

Microprocessor-based controllers in embedded-system applications commonly utilize look-up tables for retrieving a stored value of a dependent variable as a function of one or more independent variables or keys. In applications requiring large tables, the look-up function can require a considerable amount of time, to the point of perceptibly delaying the system response. A known way of reducing the data retrieval time is to create a hash table that links the memory locations of the data table to a hash index, and to link the keys to the hash index with a hash function. This technique can result in a nearly constant data retrieval time, since each table look-up procedure involves essentially the same number of steps. However, memory limitations often preclude using fully-populated hash tables where each memory location of the data table is linked to a unique hash index. A compromise approach is to utilize a chained hash table in which several memory locations of the data table are chained to each element of an abbreviated hash index. This saves memory, but requires an additional routine (referred to as chaining) for searching through the chained data for the selected hash index.

SUMMARY OF THE INVENTION

The present invention is directed to an improved table look-up method in which accessed key values of a data table are assigned weights based on usage history (frequency and age, for example), and a hash table chains the highest-weight key values to an abbreviated hash index. The hash table includes keys having at least a predetermined weight so that highly accessed keys are identified by hashing. Additionally, the keys chained to a given hash index are ordered based on their weight in order to optimize the overall data retrieval time. The weights assigned to accessed keys are updated over time so that the content of the hash table is adaptively updated to suit the current table look-up requirements.

DESCRIPTION OF THE PREFERRED EMBODIMENT

Figure 1:
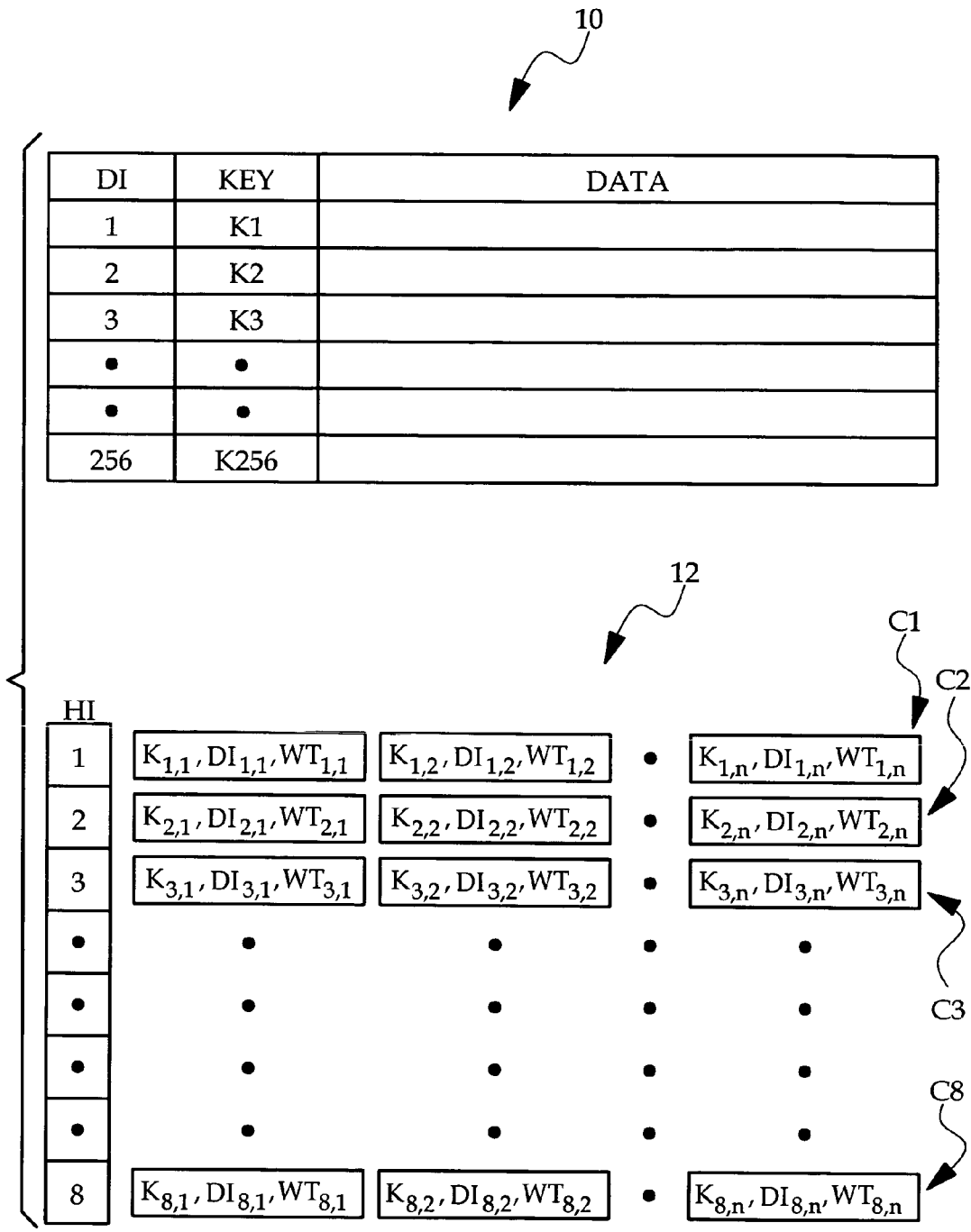
FIG. 1 is a diagram of a data table and an abbreviated index hash table according to the invention.

Referring to FIG. 1, the reference numerals 10 and 12 designate tables implemented in the non-volatile memory of a microprocessor-based controller, for example. Table 10 is a data table that stores values of a dependent variable (DATA) as a function of an independent variable (KEY), while table 12 is a hash table that links a chain C1-C8 of key elements to a hash index (HI). A data index (DI) is assigned to each data entry in table 10, and hash table 12 stores the data index (DI) corresponding to each chained key. A predetermined hash function $F_H$ mathematically links the key values of table 10 to the hash index of table 12. In the illustration of FIG. 1, the data table 10 can store up to 256 data entries, and the hash table 12 can store up to 8 chains of key elements.

In general, table look-up by hashing involves three steps. First, the hash function $F_H$ is applied to the supplied KEY (i.e., the independent variable) to derive a corresponding hash index (HI). In the illustration of FIG. 1, for example, the hash function $F_H$ allocates the 256 possible key values of data table 10 among the 8 possible HI values of hash table 12; in this case, 32 different key elements would be assigned to each hash index in a linear or proportional allocation. Second, the key elements chained to the derived hash index are probed to find the supplied KEY and the data index (DI) stored for that key in the hash table 12. And third, the data index (DI) obtained from hash table 12 is applied to data table 10 to retrieve the stored data corresponding to the supplied KEY.

If memory constraints permit, each KEY of data table 10 can be represented in hash table 12. In the linear example mentioned above, for example, 32 key elements could be chained to each of the 8 hash index values. However, memory constraints frequently rule out such an approach, particularly in embedded system applications. Accordingly, only a portion of the possible KEY values are represented in the hash table 12 of the present invention. In responding to a table look-up request for a supplied KEY, the controller first attempts to identify the data corresponding to the KEY by hashing as described above. If the KEY is not represented in hash table 12, the controller resorts to a conventional linear or logarithmic search of data table 10.

According to the present invention, the admissibility of any given KEY to the hash table 12 is governed by a weight (WT) that is assigned to each accessed KEY. Thus, in the illustration of FIG. 1, each key element in hash table 12 comprises three components: the key ($K_{1,1}$, for example), the corresponding data index ($DI_{1,1}$, for example) and the corresponding weight ($WT_{1,1}$, for example). The first subscript of each term designates the hash index to which it is chained, while the second subscript designates the order of the term in the chain. The weight (WT) provides a measure of the access history (frequency, age, etc.) of that KEY, and the hash table 12 only includes the highest weight keys. The weight (WT) assigned to any given KEY will typically vary over time depending on operating conditions of the system, and the hash table 12 is updated over time to adapt to the changing operating conditions. Furthermore, the represented keys within any given chain (C1-C8) in hash table 12 are ordered by their weight (WT) so that when a chain is probed in a table look-up procedure, the key elements in the respective chain are probed in order of weight, starting with the key having the highest weight. In a preferred implementation, only keys having a weight (WT) in excess of a minimum weight WTmin are represented in hash table 12; in other words, the subscript "n" in the final terms of hash table 12 simply means the last term of a given chain. Alternatively, the hash table 12 could be configured to store the same number of key elements in each chain—that is, the n highest weight key elements for any hash index value.

Figure 2:
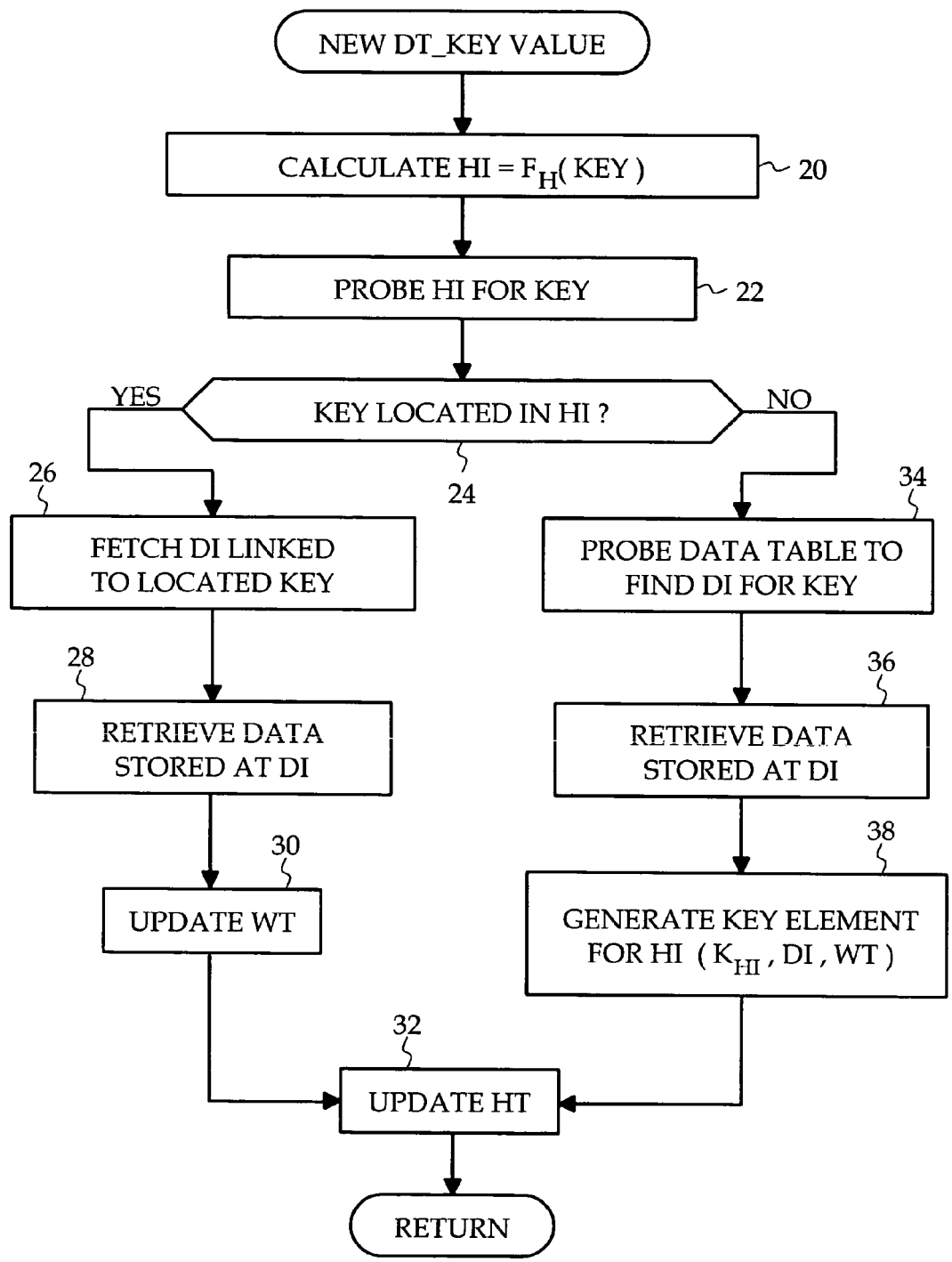
FIG. 2 is a flow diagram of a table look-up routine according to the invention.
Figure 3:
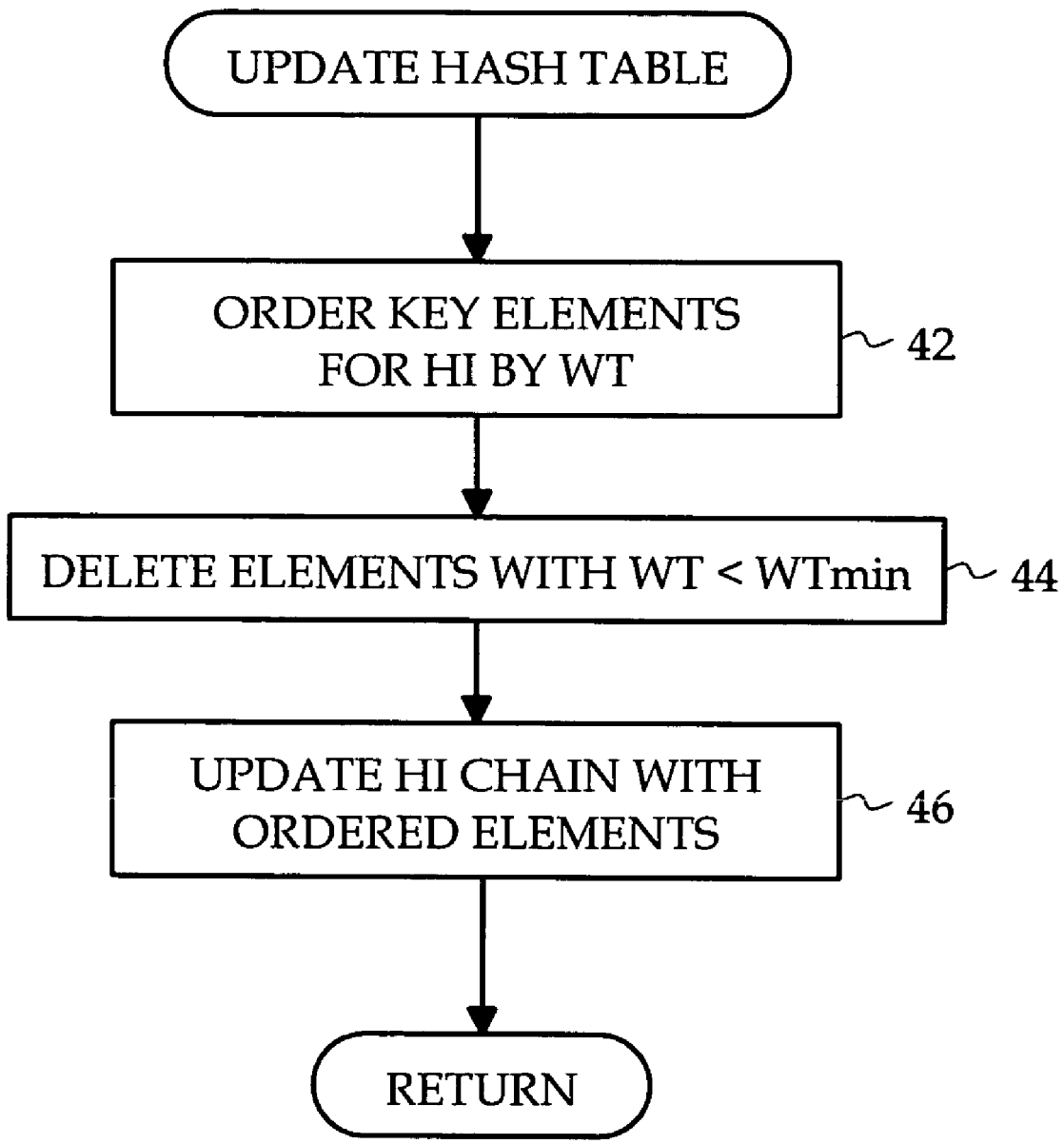
FIG. 3 is a flow diagram of a hash table updating routine according to the invention.

The flow charts of FIGS. 2 and 3 respectively represent high and low priority software routines executed by a microprocessor-based controller of a system including the tables 10 and 12 of FIG. 1. The routine represented by the flow diagram of FIG. 2 is executed in response to a look-up request for data corresponding to a new KEY value. The routine represented by the flow diagram of FIG. 3 is executed after each table look-up procedure to update the contents of hash table 12, although it can be postponed if the controller has to respond to higher priority requests.

Referring to FIG. 2, the blocks 20-28 designate the three basic steps of table look-up by hashing. At block 20, the hash function $F_H$ is applied to the supplied KEY to derive a corresponding hash index (HI). At block 22, the key elements chained to the hash index derived at block 20 are probed to find the key element corresponding to the supplied KEY and the data index (DI) of that key element. Block 24 determines if the corresponding key element was located in the probed chain. If so, the blocks 26 and 28 are executed to fetch the data index of the located key element and to retrieve the corresponding data from data table 10. Additionally, the blocks 30 and 32 are executed to update or assign a weight (WT) to the supplied KEY based on its access history and to request a corresponding update of hash table 12. As indicated above, the weight may be a function of frequency (i.e., how many times this KEY has been accessed in the previous one minute of operation, for example) or age (i.e., where the weight represents the time since this KEY was last accessed), or some combination of frequency and age.

If block 24 determines that the key element corresponding to the supplied KEY was not located in the probed chain (i.e., the KEY is not represented in hash table 12), the blocks 34 and 36 are executed to carry out the table look-up function using a conventional linear or logarithmic search of data table 10. Thus, the block 34 probes data table 10 to find the data index DI that corresponds to the supplied KEY, and the block 36 retrieves the corresponding data from data table 10. Also, the block 38 is executed to generate a key element corresponding to the supplied KEY for possible inclusion in hash table 12 when the updating routine of FIG. 3 is executed. The "HI" subscript of the key element K in block 38 is the hash index HI calculated at block 20, the DI term is the data index found at block 34, and the WT term is the weight, which may be determined as described above in reference to block 30. Finally, the block 32 is executed to request updating of hash table 12, as mentioned above.

Referring now to the hash table update routine of FIG. 3, the block 42 is first executed to locate all key elements that could possibly be chained to the hash index HI identified in the previous look-up procedure, and to order them by assigned weight, with the highest weight first. The block 44 then removes those key elements having a weight less than the prescribed minimum weight WTmin, and the block 46 stores the remaining key elements in hash table 12 in the memory sector assigned to hash index HI. In this way, the pertinent portion of hash table 12 is updated following each table look-up procedure, and the rest of hash table 12 remains unchanged. Alternatively, of course, the entire hash table 12 could be updated from time to time in a single operation.

In summary, the table look-up method of the present invention realizes the data retrieval speed advantages of hashing while substantially reducing the amount of additional memory that is traditionally required for hashing. While the invention has been described with respect to the illustrated embodiment, it is recognized that numerous modifications and variations in addition to those mentioned herein will occur to those skilled in the art. For example, the invention may be applied to tables having more than one independent variable (KEY), and so on. Additionally, the considerations for determining the weight of an accessed key can vary with the application or even the operating condition of the system to optimize the data retrieval time. For example, in a system where the independent variable (KEY) is a measured engine variable such as the speed of an engine or vehicle, it can be expected that the supplied KEY will frequently be repeated under quasi steady state operating conditions, and the weight may be assigned primarily on the basis of age (i.e., the time since the KEY was last accessed). Accordingly, it is intended that the invention not be limited to the disclosed embodiment, but that it have the full scope permitted by the language of the following claims.

The invention claimed is:

1. A method of controlling a system using control data stored in a data table within a controller memory unit indexed as a function of a measurable parameter of the system, the method comprising the steps of:

establishing a hash table in said memory unit having hash index values;

linking various values of said measurable parameter to said hash index values with a hash function;

forming key elements for each of the linked values of said measurable parameter, each key element including a hash index value, an index value for said data table and a weight value;

selecting for inclusion in the hash table only key elements for which said weight value exceeds a specified weight, and chaining the selected key elements to a respective hash index value in said hash table;

obtaining a sample of said measurable parameter;

determining a hash index value corresponding to said sample, probing the key elements chained to the determined hash index to locate a key element for said sample, and locating control data stored for said sample using a data table index value of the located key element;

probing said data table to locate the control data for said sample if a key element for said sample is not located in said hash table; and controlling said system using the located control data.

2. The method of claim 1, including the steps of:

periodically updating said weight values based on at least one of access frequency and time since last access; and repeating the steps of selecting for inclusion in the hash table only key elements for which said weight value exceeds a specified weight, and chaining the selected key elements to a respective hash index value in said hash table.

3. The method of claim 1, including the step of:

ordering the key elements chained to a respective hash index value based on said weight values so that such key elements are probed in order of weight value.

4. The method of claim 3, including the steps of:

periodically updating said weight values; and re-ordering said key elements based on the updated weight values.

5. The method of claim 1, including the steps of:

periodically updating said weight values; and repeating the steps of selecting for inclusion in the hash table only key elements for which said weight value exceeds a specified weight, and chaining the selected key elements to a respective hash index value in said hash table.

* * * * *